C. L. THON.
HAY SLING.
APPLICATION FILED MAR. 16, 1918.
1,292,154.
Patented Jan. 21, 1919.
2 SHEETS—SHEET 1.
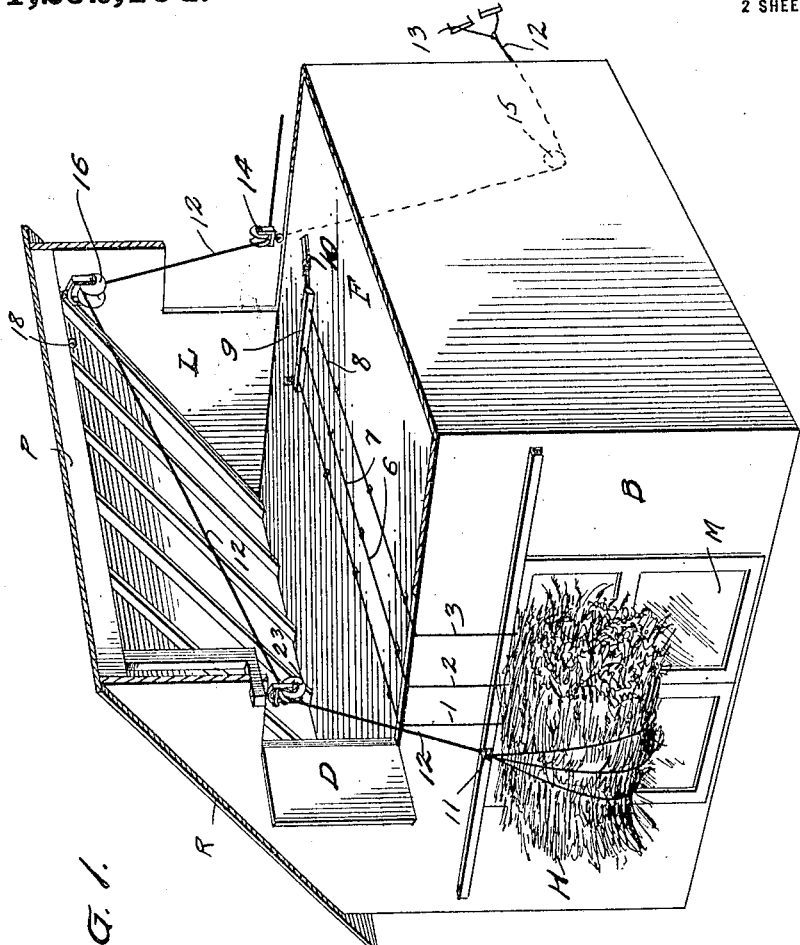
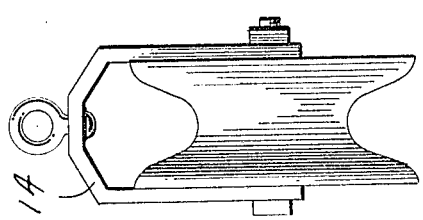
WITNESSES
INVENTOR
Carl. L. Thon
BY
ATTORNEY C. L. THON.
HAY SLING.
APPLICATION FILED MAR. 16, 1918.
1,292,154.
Patented Jan. 21, 1919.
2 SHEETS—SHEET 2.
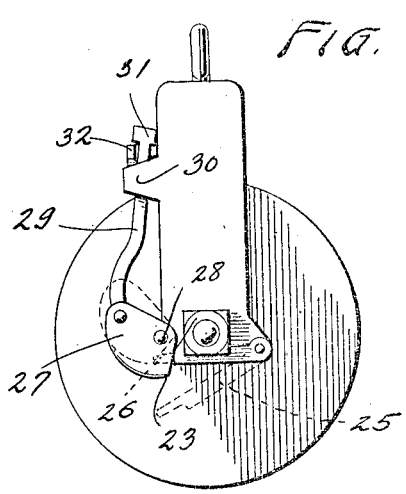
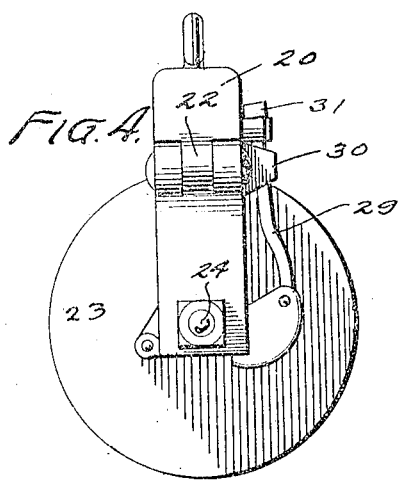
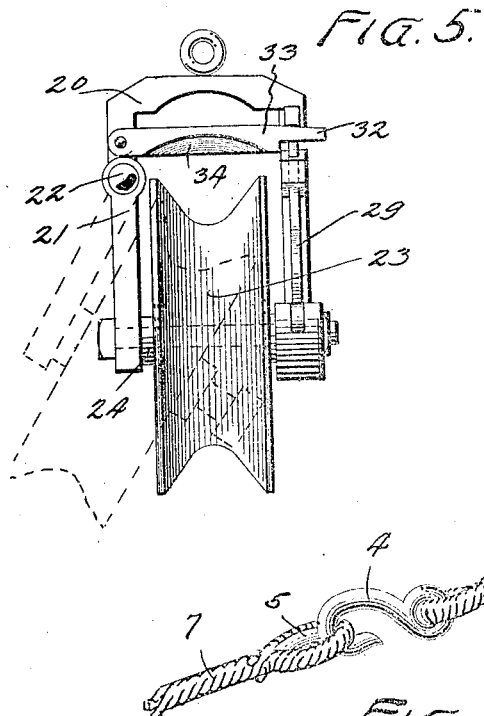
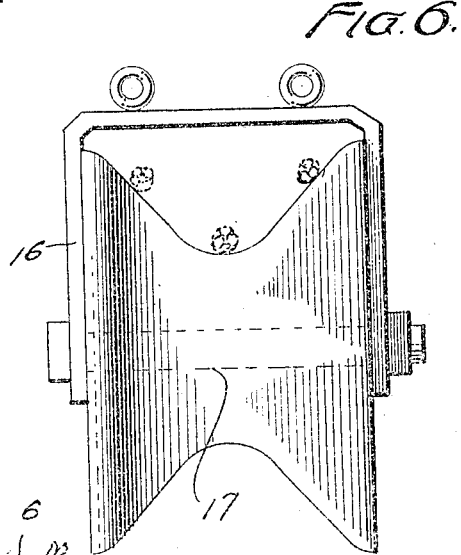
INVENTOR
Carl L. Thon
WITNESSES
BY
ATTORNEY

UNITED STATES PATENT OFFICE.

CARL L. THON, OF HARVEY, NORTH DAKOTA.

HAY-SLING.

1,292,154.   Specification of Letters Patent.   Patented Jan. 21, 1919.

Application filed March 16, 1918. Serial No. 222,882.

*To all whom it may concern:*

Be it known that I, CARL L. THON, a citizen of the United States, residing at Harvey, in the county of Wells and State of North Dakota, have invented certain new and useful Improvements in Hay-Slings, of which the following is a specification.

This invention relates to traversing hoists, and more especially to those producing a linear movement by means of a cable; and the object of the same is to provide an improved hay sling, snatch block or pulley, and other correlated details which go to make up a system of unloading hay and grain and loading it into the loft of a barn or the like.

Details are amplified in the following specification, and reference is made to the drawings herewith, wherein:—
Figure 1 is a perspective view of a barn with that part of its roof in the foreground removed, showing the application of my device complete, Fig. 2 is an edge view of the idler pulley, Fig. 3 is a side view and Fig. 4 a side view of the opposite side of the trip pulley, and Fig. 5 is an edge view of the trip pulley showing its sheave in dotted lines as swung aside, Fig. 6 is an edge view of the main pulley, Fig. 7 is a perspective detail showing the detachable connection between the sections of the hay sling.
In Fig. 1 of the drawings I have shown a bar B having main doors M on the ground floor, the far half of a roof R rising to the ridge pole P and producing a loft L with whose doors D only we are concerned; and the letter H designates a load of hay or grain which it is the purpose of this invention to lift off the hay wagon bodily, pass through the loft doors D, and transport over the loft floor F to a desired point therein.
The hay sling forming an essential element of this invention is made up of a plurality of ropes, herein shown as three in number and indicated at 1, 2, and 3. The several ropes are also made in lengths or sections probably about fourteen feet long (more or less) and the sections are connected to each other end to end by hook and eye connections 4, 5, as best seen in Fig. 7, although any other quickly detachable connection would answer. The sections need not all be of the same length, and I have shown several sections at 6, 7, and 8 connected end to end and lying on the loft floor F. The several ropes of the rearmost or innermost section 8 are connected at their innermost extremities to a cross bar 9 also lying on the floor, and from the ends of this bar guy ropes 10 are led to appropriate points within the loft, to which point they are detachably connected. The several ropes of the front or what might be called the main section, at their front or outer ends, converge as seen in the foreground of Fig. 1 and are connected to the large end of a conical plug 11, and from the small end of this plug what I will call the main rope 12 leads over a trip pulley, a main pulley, and an idle pulley and thence to a suitable source of power which is indicated in Fig. 1 as a whiffle tree 13 to which a team of horses is to be attached. The idle pulley may be located where shown at 14 in full lines in Fig. 1, or at a lower point as indicated in dotted lines at 15. The main pulley 16 has its frame attached to the ridge pole P near the inner end of the latter, and within said frame is mounted a rather wide sheave 17, capable of accommodating all three of the sling ropes. Hooks or eyes 18 may also be provided along the ridge pole whereby the position of this main pulley may be adjusted if desired. There is nothing peculiar about it excepting perhaps that the channel of its sheave should be rather deep so as to permit the passage of the plug 11 under the frame or yoke of this pulley in a manner which will be described below.

The trip pulley best seen in Figs. 3, 4, and 5 has a frame 20 whereof one side 21 is hinged as at 22, and the sheave 23 is mounted on a shaft 24 carried at the free end of this hinged side. When the sheave and shaft stand in their normal position as shown in full lines in Fig. 5, what might be called the free end of the shaft engages the other side of the frame, in which it is held by a pivoted latch carried thereby, as best seen in dotted lines at 25 in Fig. 3. The tip of this latch is adapted to engage a recess or pocket 26 in a dog 27 which is pivoted to the rigid side of the frame at 28 in a manner that its weight causes it to swing normally into engagement with the tip of the latch to hold it locked. From the outer end of the dog a link 29 rises through a suitable guide 30 and has a T-head 31 at its upper end, and this T-head is engaged by the forked extremity 32 of a trigger 33 pivoted in the frame 20 and having its body overlying the sheave 23 as best seen in Fig. 5. The forward side or corner of the body of the trigger is beveled as shown at 34 where it overlies the channeled periphery of the sheave, and the space between these elements is such that the smaller end of the conical plug 11 may pass through it, but the larger end thereof when it arrives will cause the lifting of the trigger. This obviously pulls on the link 29, rocks the dog 27, and disengages the tip of the latch 25; and as the latter drops it permits the swinging of the hinged side 21 of the frame and the descent of the shaft 24 and sheave 23 as shown in dotted lines in Fig. 5. Thus it is clear that the passage of the plug through this pulley trips it so that it automatically releases the rope. The pulley is supported in the cap of the doorway at the front of the loft L as seen in Fig. 1 by suitable means not necessary to illustrate in detail.

In the use of this invention, let us assume that it is desired to deposit the first load of hay on the loft floor F near the far end of the loft L. The cross bar 9 is disposed about as shown in Fig. 1 by means of the guy ropes 10, sling sections 8, 7, and 6 are connected with each other and laid across the floor F, and the forward section 1, 2, and 3 has its ropes hanging over the front of the barn B. It is understood that the main sling section has its ropes laid on the hay rack or hay wagon before the load of hay H is piled thereon. The wagon is now driven up to the barn B, and the horses perhaps pass through the main doors M into the barn so that the wagon stands directly beneath the position where the hay is shown in Fig. 1. The eyes 5 of the main-sling ropes are now connected with the hooks 4 of the ropes or sections 1, 2, and 3 at a point which would be behind the hay in this view and therefore not shown; and the main rope 12 is connected with the apex or small end of the plug 11, this rope being rove over the trip pulley, the main pulley, the idler, and carrier out to the source of power. Assuming that the latter is a team of horses, when they are started up it is obvious that the sling rope will roll the load of hay H upward along the front of the barn, through the doorway D, and rearward along the floor F to and over the cross bar 9. Meanwhile the main rope will draw upward over the trip pulley until the plug arrives and trips it, and then the rope will straighten out between the load and the main pulley 16; eventually the plug will arrive at the main pulley and pass over it, and the channel in its sheave 17 will collect the sling ropes as seen in Fig. 6. Thus it will be obvious that the load can be rolled rearward over the floor F to any desired point. Having passed the cross bar, the latter is set forward by loosening on the guy ropes or changing their points of attachment to the floor, and then the operation is repeated. While I have shown the ropes 6, 7, and 8 as laid directly on the floor, when the second layer of hay or grain is to be loaded into the loft, these ropes will be laid across the first layer in a manner not necessary to illustrate. While I have shown these ropes as leading straight to the rear from the doorway, it is quite possible that they could be led a little bias or oblique, and in this manner loads of hay could be deposited in the loft out under or near the eaves. While I have shown these ropes in the series, there could be more or less, and of course the sections are not necessarily fourteen feet in length, and the detachable connections are not necessarily those shown in Fig. 7. These connections are for shortening the ropes as a whole, as the cross bar 9 is moved forward from time to time. After depositing one load within the loft, a reverse movement of parts permits the resumption of normal positions, the main rope being reengaged with the trip pulley, and the operation is repeated for the next load of hay to be housed, whether this load be on the same wagon at its subsequent trip from the field or on another wagon which stands ready to deliver. The proportions and materials of parts, as well as many details are unimportant.

What is claimed as new is:—

1. In a hay sling, the combination with fastening means, a plurality of ropes leading therefrom to a common point, and a plug secured to said point; of a main rope connected with the plug and led through a loft inlet door and to a source of power, and a trip pulley carried by the cap bar of said door and over which said main rope passes, the pulley adapted to be tripped by the passage of said plug, for the purpose set forth.

2. In a hay sling, the combination with a cross bar, a plurality of ropes leading in parallelism therefrom and converging to a common point at their remote ends, and a conical plug secured at its larger end to said point; of means for adjustably mounting said cross bar over a loft floor, a main rope connected with the apex of said plug and led through the loft inlet door and along its ridge to a source of power, and a trip pulley carried by the cap bar of said door and over which said main rope passes, the pulley adapted to be tripped by the passage of said plug, for the purpose set forth.

3. In a hay-loading system for barns and the like, the combination with a sling composed of a series of parallel ropes, means for connecting their inner ends adjustably to the floor of the barn loft, their bodies passing out its entrance door and converging at their front ends, and a conical plug secured at its base to the last-named ends; of a main rope leading from the apex of the plug through said door and over pulleys to a remote source of power, and a trip pulley mounted in the cap bar of the door and over which said main rope is roved, the pulley being tripped by the passage of the plug, for the purpose set forth.

In testimony whereof I affix my signature in presence of two witnesses.

CARL L. THON.

Witnesses:
L. W. MILLER,
J. A. BAKKEN.